(12) United States Patent
Eleveld et al.

(10) Patent No.: US 6,403,667 B1
(45) Date of Patent: Jun. 11, 2002

(54) MACROMER STABILISER PRECURSOR FOR POLYMER POLYOLS

(75) Inventors: Michiel Barend Eleveld; Willem Karzijn; Ronald Van Kempen, all of Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/600,058

(22) PCT Filed: Feb. 9, 1999

(86) PCT No.: PCT/EP99/00857

§ 371 (c)(1),
(2), (4) Date: Jul. 10, 2000

(87) PCT Pub. No.: WO99/40144

PCT Pub. Date: Aug. 12, 1999

(30) Foreign Application Priority Data

Feb. 9, 1998 (EP) .............................. 98200378

(51) Int. Cl.$^7$ .............................. C08G 18/48
(52) U.S. Cl. .................. 521/174; 521/137; 521/155; 521/170; 525/31; 525/39; 525/438; 525/444; 525/445
(58) Field of Search .................. 525/438, 445, 525/31, 39, 444; 521/137, 155, 170, 174

(56) References Cited

U.S. PATENT DOCUMENTS

| | | | |
|---|---|---|---|
| 4,390,645 A | | 6/1983 | Hoffman et al. |
| 5,011,908 A | | 4/1991 | Hager |
| 5,364,906 A | | 11/1994 | Critchfield et al. |
| 6,143,802 A | * | 11/2000 | Simroth et al. ............. 521/137 |

FOREIGN PATENT DOCUMENTS

| | | |
|---|---|---|
| EP | 461800 | 6/1990 |
| GB | 1126025 | 9/1968 |
| GB | 1217005 | 12/1970 |
| JP | 02/247208 | 3/1990 |

* cited by examiner

Primary Examiner—John M. Cooney, Jr.
(74) Attorney, Agent, or Firm—Y. Grace Tsang

(57) ABSTRACT

Process for the preparation of a macramer suitable as a stabilizer precursor in a polymer polyol, which process comprises reacting a polyol with a cyclic dicarboxylic acid anhydride not containing any polymerizable double bond, and subsequently reacting the adduct thus obtained with an epoxide compound containing a polymerizable double bond. The macromers can be applied for the preparation of polymer polyols which are, in turn, very suitable for manufacturing flexible polyurethane foams.

16 Claims, No Drawings

MACROMER STABILISER PRECURSOR FOR POLYMER POLYOLS

The present invention relates to a macromer which is suitable as stabiliser precursor in polymer polyols. More specifically, the present invention relates to a process for the preparation of a macromer suitable as stabiliser precursor in polymer polyols, to the macromer obtainable by this process, to a process for the preparation of polymer polyols using this macromer and to the polymer polyols obtainable by this process.

Within the context of the present invention a macromer is a compound of which the molecule at least comprises one or more polymerizable double bonds and one or more polyol tails. The double bond can copolymerize with ethylenically unsaturated monomers, thus becoming part of the polymer chain. The polyol tails extending from the polymer chain are compatible with the liquid polyol medium in which the polymer is dispersed, thus stabilising the dispersion. The concept of using macromers as dispersion stabiliser precursors in polymer polyol systems is known as becomes, for instance, apparent from U.S. Pat. Nos. 4,390,645; 5,364,906 and EP-A-0,461,800.

Polymer polyols are commonly used for the manufacture of flexible polyurethane foams. Flexible polyurethane foams are widely used in numerous applications. Main sectors of application are automotive and aircraft industry, upholstered furniture and technical articles. For instance, full foam seats, top pads for the seats and restraints for back and head, all made from flexible polyurethane foam, are widely used in cars and aeroplanes. Other applications include the use of flexible polyurethane foam as carpet backings, bedding and mattresses, foamed seat saddles for motorbikes, gaskets between a car body and its lights, lip seals of air filters for engines and insulating layer on car parts and engine parts to reduce sound and vibration. It will be appreciated that each specific application puts its own demands on the flexible foam to be used. Important characteristics in this connection are density, hardness, resilience and dampening behaviour of the foam and in order to fit each application, these characteristics should be optimally balanced and adjusted.

A problem generally encountered in the manufacture of polymer polyols, i.e. a system wherein a polymer is stably dispersed in a base polyol, is to obtain a polymer polyol having both a relatively high solid polymer content and a sufficiently low viscosity for ease of handling. A polymer polyol having this combination of properties is favourable for the properties of any polyurethane foam produced from such polymer polyol. In order to enable a stable dispersion of the polymer particles in the liquid polyol medium a dispersion stabiliser precursor is generally required.

JP-A-02/247208 discloses a high molecular weight polyether ester polyol as a dispersion stabiliser for a polymer polyol. This dispersion stabiliser is obtained by polymerization of an allyl group-containing polyether ester polyol, which in return is obtained by reacting a polyether polyol with an allyl glycidyl ether, a saturated dicarboxylic acid anhydride and an alkylene oxide in a single step. The polymer polyol is subsequently obtained by dissolving the dispersion stabiliser in a polyether polyol and polymerizing the ethylenically unsaturated monomer(s) therein using a radical polymerization initiator.

Although the dispersion stabiliser disclosed in JP-A-02/247208 results in polymer polyols having relatively high polymer contents (around 45% by weight in the working examples) in combination with relatively low viscosities (around 5000–5500 mPa.s in the working examples), there is still room for improvement, perhaps not so much in terms of the final performance of the dispersion stabiliser, but more in the effectiveness of applying the stabiliser. In this connection the number of process steps to arrive at the stabilised polymer polyol system, the number of components necessary to prepare the stabiliser including neutralizing agents and polymerization catalysts, the processability and ease of handling of the stabiliser and the way in which the stabiliser is prepared are of importance. The present invention aims to optimise all these aspects. Furthermore, the final stabiliser should have an excellent stabilising performance enabling the formation of polymer polyols having a high polymer content in combination with a low viscosity. If such stabilizer could be obtained, this would be attractive from both technical and commercial perspective.

The present invention provides a process for preparing a macromer suitable as a dispersion stabiliser precursor for polymer polyols and having an excellent stabilising performance.

Thus, the present invention relates to a process for the preparation of a macromer suitable as a stabiliser precursor in a polymer polyol, which process comprises reacting a polyol with a cyclic dicarboxylic acid anhydride not containing any polymerizable double bond, and subsequently reacting the adduct thus obtained with an epoxide compound containing a polymerisable double bond.

A main advantage of the process according to the present invention is that it does not involve a separate polymerization step to obtain an isolated stabiliser. Instead, a stabiliser precursor (i.e. the macromer) is obtained. The actual stabiliser is formed during the formation of the dispersed polymer when the macromer reacts with the monomers building this polymer. A further advantage, accordingly, is the fact that in the preparation of the macromer no separate polymerization catalyst or neutralizing agent is necessary. Moreover, the macromer obtained according to the present process is far less viscous than the polymeric stabiliser obtained according to JP-A-02/247208, as a result of which it is easier to handle and has a better processability, i.e. it can be easier blended into the polymerization reaction system.

In GB-A-1,217,005 a process for the preparation of a polyol polymer is disclosed, wherein a polyether polyol is first reacted with a polycarboxylic acid cyclic anhydride whereafter the intermediate product thus obtained is reacted with an 1,2-epoxide, such as ethylene oxide and propylene oxide. Epoxides containing ethylenic unsaturation to enable inclusion in the polymer chain of a polymer derived from ethylenically unsaturated monomers are not disclosed. GB-A-1,217,005 is also silent on polymer polyol systems.

In GB-A-1,126,025 a process for manufacturing modified polymeric polyol is disclosed, wherein an ethylenically unsaturated compound is polymerised under substantially anhydrous conditions in the presence of a free radical polymerization catalyst and a polymeric polyol containing at least 0.7 ethylenically unsaturated groups in the molecule. The polymeric polyol suitably is obtained by reacting a hydroxylated polymer with an unsaturated epoxide such as allyl glycidyl ether. GB-A-1,126,025 is, however, silent on the use of cyclic anhydrides of dicarboxylic acids and on the use of the modified polymeric polyols in polymer polyol systems.

The polyol used for preparing the macromer in the process according the present invention suitably is a polyether polyol, also frequently referred to as polyoxyalkylene polyols. Such polyether polyols are typically obtained by reacting a starting compound having a plurality of active hydrogen atoms with one or more alkylene oxides, such as ethylene oxide, propylene oxide, butylene oxide or mixtures of two or more of these. Suitable polyether polyols are those having a nominal molecular weight in the range of from 2500 to 15,000 and an average nominal functionality (Fn) of at least 2.0. Preferably, the polyol also has a high primary hydroxyl content, suitably of at least 70%. It has been found particularly advantageous to use polyols having a molecular weight in the range of from 5000 to 14,000, a Fn in the range of from 2.5 to 6.0, and a primary hydroxyl content in the range of from 70 to 100%, more preferably from 75 to 95%. The hydroxyl-value of the polyol suitably has a value of from 20 to 150 mg KOH/g, more suitably of from 25 to 75 mg KOH/g.

The dicarboxylic acid anhydride used should have a cyclic structure and should not contain any polymerizable ethylenic unsaturation, i.e. it must be free of any double bond that could copolymerize with ethylenically unsaturated monomers used to prepare polymers in a polymer polyol system. Suitable anhydrides then include succinic anhydride, glutaric anhydride, hexahydro-phthalic anhydride, tetrahydro-phthalic anhydride and phthalic anhydride, of which phthalic anhydride is preferred.

The epoxide compound containing a polymerisable double bond in principle can be any 1,2-epoxide containing ethylenic unsaturation. Examples include glycidyl ethers, such as allyl glycidyl ether, and glycidyl esters, such as glycidyl acrylate or glycidyl methacrylate. An epoxide compound which was found to give very good results is glycidyl methacrylate.

It has also been found that in order to increase the molecular weight of the macromer an additional reaction step involving a reaction with a di- or higher functional (i.e. polyfunctional) epoxide compound or a di- or higher functional (i.e. polyfunctional) isocyanate compound may be applied.

Any polyfunctional epoxide used will react with acid groups present on the macromer precursor chains as a result of the reaction between polyol and anhydride, thus in fact cross-linking the various macromer precursor chains. The reaction with the polyfunctional epoxide may take place either directly before or directly after the reaction with the epoxide compound containing a polymerisable double bond. Accordingly, the adduct formed by reacting the polyol with the cyclic anhydride can first be partly reacted with an di- or higher functional epoxide compound before being reacted with the epoxide compound containing a polymerisable double bond. Alternatively, said adduct is first partly reacted with the epoxide compound containing a polymerisable double bond and the reaction product thus obtained is subsequently reacted with an di- or higher functional epoxide.

Any polyfunctional isocyanate used will react with suitable reactive groups, suitably hydroxyl groups, present on the macromer precursor chains, thus achieving cross-linking of the various macromer precursor chains. The polyfunctional isocyanate can either be reacted with the polyol preceding the reaction between polyol and cyclic anhydride or can be reacted with the reaction product of the reaction between the epoxide compound containing a polymerisable double bond with the adduct of the reaction between the polyol and the cyclic anhydride. Thus, the di- or higher functional isocyanate may be applied directly before the reaction between polyol and cyclic anhydride or directly after the reaction with the epoxide compound containing a polymerisable double bond.

Suitable polyfunctional epoxide compounds include epoxy resins having a functionality of two or higher, such as the diglycidyl ether of bisphenol A, the polyglycidyl ether of phenol novolac or the tetraglycidyl ether of methyl diphenyl amine. A suitable di-epoxide is commercially available under the trade name EPIKOTE 828. Suitable polyfunctional isocyanates include those normally applied in the manufacture of polyurethanes and include inter alia 2,4-toluene diisocyanate (2,4-TDI), 2,6-TDI, mixtures of 2,4-TDI and 2,6-TDI and 4,4'-diphenylmethane diisocyanate (MDI).

The amounts in which the various components are used may vary within broad limits. The polyol and cyclic anhydride are suitably used in a molar ratio of anhydride:polyol of 0.2:1 to 4:1, preferably 0.5:1 to 2:1. The amount of epoxide compound expressed in molar ratio relative to the starting polyol will normally vary from 0.2:1 to 4:1, preferably from 0.5:1 to 2:1. The amount of polyfunctional epoxide or isocyanate used expressed in molar ratio relative to the starting polyol will also normally vary in the range of from 1:10 to 1:1.

In addition to the components indicated above a small amount of catalyst may be employed to facilitate the reaction between the polyfunctional epoxide, if used, and the macromer precursor chain. Such catalysts are known in the art and include organic phosphorus compounds, such as tetramethyl phosphonium iodide, bromide or hydroxide, trimethylbenzyl phosphonium bromide or chloride, ethyl triphenyl phosphonium iodide, ethyl tri(p-tolyl) phosphonium bromide or chloride and many other $(alkyl)_n(Ar)_m$ phosphonium halides with n+m=4 and Ar representing an aromatic group, such as phenyl, tolyl or benzyl. Other suitable catalysts include imidazoles, such as 2-methyl imidazole and tertiary amines, such as triethyl amine, tripropyl amine and tributyl amine.

The temperature at which the preparation of the macromer is carried out may range from 60° C. to 150° C., suitably from 75° C. to 135° C.

The macromer produced according to the method described herein before suitably has a nominal molecular weight of at least 4000. The present invention, accordingly, also relates to a macromer having a nominal molecular weight of at least 4000, preferably in the range of from 5000 to 50,000, obtainable by the process as described herein before.

As stated before, this macromer is an excellent stabiliser precursor for polymer dispersions in a liquid polyol medium. Accordingly, in a further aspect the present invention relates to a process for the preparation of a polymer polyol, which process comprises polymerizing in a base polyol at least one ethylenically unsaturated monomer in the presence of a polymerization initiator and a macromer as described herein before.

The base polyol may be any polyol known to be suitable as the liquid medium in polymer polyol systems. Accordingly, any polyol commercially available for polyurethane systems can in principle be applied. Examples include CARADOL SC46-02, CARADOL MC36-03, CARADOL SC56-02 and CARADOL MH56-03. The base polyol used may be the same polyol as the polyol used for preparing the macromer, but can also be a different polyol.

Suitable ethylenically unsaturated monomers for preparing the dispersed polymer include vinyl aromatic hydrocarbons, like styrene, alpha-methyl styrene, methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred ethylenically unsaturated monomers to be used for the purpose of the present invention are styrene and acrylonitrile in a molar ratio of from 50:50 to 100:0. It is, however, particularly preferred to use styrene alone or a combination of styrene and acrylonitrile in a molar ratio styrene:acrylonitrile of from 55:45 to 80:20, resulting in the dispersed polymers polystyrene and styrene-acrylonitrile (SAN) copolymers, respectively.

The amount of ethylenically unsaturated monomers used may vary between 10 and 60% by weight based on total weight of base polyol, monomer(s) and macromer. Preferably, however, the amount of ethylenically unsaturated monomer(s) is 20 to 55% by weight, more preferably 30 to 50% by weight, based on total weight of base polyol, monomer(s) and macromer.

Polymerization of the monomers is effected by the presence of a polymerization initiator. Such initiator is usually applied in an amount of from 0.01 to 5% by weight based on total weight of monomers. Suitable polymerization initiators are known in the art and include both peroxide compounds and azo compounds. Examples of peroxides are dibenzoyl peroxide, lauroyl peroxide, t-butyl hydroperoxide, benzoyl peroxide and di-t-butyl peroxide. Examples of suitable azo compounds are azobis(isobutyronitrile) (AIBN) and azobis (2-methylbutanenitrile) (AMBN).

Chain transfer agents may also be added to or be present in the polymerization reaction medium in small amounts. The use of chain transfer agents and their nature is known in the art. Chain transfer agents enable a control of the cross-linking occurring between the various polymer molecules and hence may effect stability of the polymer polyol. If used at all, a chain transfer agent is suitably used in an amount of from 0.1 to 6% by weight, preferably 0.2 to 5% by weight, based on total weight of reactants. Examples of suitable chain transfer agents are 1-butanol, 2-butanol, isopropanol, ethanol, methanol, water, cyclohexane and mercaptans, such as dodecanethiol, ethanethiol, 1-heptanethiol, 2-octanethiol and toluenethiol.

Other compounds, such as compounds facilitating mixing of the various components, compounds which have a viscosity-lowering effect and/or compounds which enable one or more of the components used to better dissolve in the reaction medium may also be applied. An example of a compound having a viscosity-lowering effect, thus enabling a better mixing of the components, is toluene.

The various components used in the process to prepare polymer polyols in accordance with the present invention may be mixed together in different ways. This can be achieved batchwise or in a continuous operation. In principle, any known manner is suitable for the purpose of the present invention. One way, for instance, is to prepare the polymer polyol by dosing the monomers, the polymerization initiator and part (10–90%) of the base polyol to a reactor containing the remainder of the base polyol (90–10%), the macromer and optionally a chain transfer agent. Other auxiliaries like toluene may be used as well and can be present in the feed and/or in the reactor.

In a further aspect the present invention relates to a polymer polyol comprising 20–55% by weight, based on total weight of the polymer polyol, of a polymer derived from at least one ethylenically unsaturated compound, which polymer is dispersed in a base polyol and stabilised with a macromer as specified herein before. Such polymer polyol may be prepared by the process as outlined above.

The polymer polyol according to the present invention is very suitable for the preparation of flexible polyurethane foams by reacting it with a suitable polyisocyanate in the presence of a suitable polyurethane catalyst, a suitable blowing agent and optionally a cross-linking agent. This reaction is also commonly denoted as foaming. Thus, the present invention also relates to a flexible polyurethane foam obtainable by foaming a composition comprising a polymer polyol as specified herein before and a polyisocyanate component.

Polyurethane catalysts are known in the art and include many different compounds. An extensive list of polyurethane catalysts is, for instance, given in U.S. Pat. No. 5,011,908. For the purpose of the present suitable catalysts include tin-based catalysts, such as tin salts and dialkyl tin salts of carboxylic acids. Specific examples are stannous octoate, stannous oleate, dibutyltin dilaureate, dibutyltin acetate and dibutyltin diacetate. Other suitable catalysts are tertiary amine, such as, for instance, bis(2,2'-dimethylamino)ethyl ether, trimethylamine, triethylamine, triethylenediamine and dimethylethanol-amine. Examples of commercially available tertiary amine catalysts are those sold under the trade names NIAX, TEGOAMIN and DABCO (all trade marks). The catalyst is typically used in an amount of from 0.01 to 2.0 parts by weight per hundred parts by weight of polymer polyol (php). Preferred amounts of catalyst are from 0.05 to 1.0 php.

The use of cross-linking agents in the production of polyurethane foams is well known. Polyfunctional glycol amines are known to be useful for this purpose. The polyfunctional glycol amine which is most frequently used and is also useful in the preparation of the present flexible polyurethane foams, is diethanol amine, often abbreviated as DEOA. If used at all, the cross-linking agent is applied in amounts up to 3.0 php, but amounts in the range of from 0.2 to 1.5 php are most suitably applied.

Suitable blowing agents include water, aceton, (liquid) carbon dioxide, halogenated hydrocarbons, aliphatic alkanes and alicyclic alkanes. Due to the ozone depleting effect of the fully chlorinated, fluorinated alkanes (CFC's) the use of this type of blowing agents is generally not preferred, although it is possible to use them within the scope of the present invention. The halogenated alkanes, wherein at least one hydrogen atom has not been substituted by a halogen atom (the so-called HCFC's) have no or hardly any ozone depleting effect and therefore are the preferred halogenated hydrocarbons to be used in physically blown foams. A very suitable HCFC type blowing agent is 1-chloro-1,1-difluoroethane. The use of water as a (chemical) blowing agent is also well known. Water reacts with isocyanate groups according to the well known NCO/H2O reaction, thereby releasing carbon dioxide which causes the blowing to occur. The aliphatic and alicyclic alkanes, finally, were developed as alternative blowing agents for the CFC's. Examples of such alkanes are n-pentane and n-hexane (aliphatic) and cyclopentane and cyclohexane (alicyclic). It will be understood that the above blowing agents may be used singly or in mixtures of two or more. The amounts wherein the blowing agents are to be used are those conventionally applied, i.e. between 0.1 to 5 php in case of water and between about 0.1 and 20 php in case of halogenated hydrocarbons, aliphatic alkanes and alicyclic alkanes.

In addition, other well known auxiliaries, such as flame retardants, foam stabilisers (surfactants) and fillers may also be used. Organosilicone surfactants are most conventionally applied as foam stabilisers in polyurethane production. A large variety of such organosilicone surfactants is commercially available. Usually, such foam stabiliser is used in an amount of up to 5% by weight based on the reaction mixture of polymer polyol reactant and polyisocyanate reactant.

In a final aspect the present invention relates to shaped articles comprising the flexible polyurethane foam described herein before.

The invention is further illustrated by the following examples without restricting the scope of the invention to these specific embodiments.

In Examples 1–6 the preparation of seven different macromers (i.e. stabiliser precursors) is described. In Example 7 the application of several of the macromers in the preparation of polymer polyols is illustrated.

EXAMPLE 1

Into a one liter reactor provided with stirrer, heater, thermocouple, condenser, inlet and outlet means, and under a blanket of nitrogen were charged:
778 g of an ethylene oxide-tipped polyoxyalkylene triol having an OH-value of 36 mg KOH/g and a nominal molecular weight of 4700;
38 g phthalic anhydride; and
60 g methyl isobutyl ketone.
The resulting mixture was heated to 120° C. and stirred overnight.

Subsequently, 40.1 g of Epikote 828 (the diglycidyl ether of bisphenol A) was added together with 0.3 g ethyl triphenyl phosphonium iodide in 10 ml dichloromethane at 120° C. and stirred overnight. Then, 8.4 g glycidyl methacrylate was added together with 0.1 g ethyl triphenyl phosphonium iodide in 10 ml dichloromethane and the resulting mixture was stirred overnight.

The product obtained was a clear, light yellow liquid having a viscosity of 28,100 mPa.s. This stabiliser precursor is further referred to as SP-1.

EXAMPLE 2

Stabiliser precursors SP-2 was prepared as described in Example 1, except that 34 g phthalic anhydride was used and 39.0 g Epikote 828 and 5.1 g glycidyl methacrylate were subsequently added simultaneously in the next stage.

The product obtained was a clear, light yellow liquid having a viscosity of 37,800 mPa.s.

EXAMPLE 3

Stabiliser precursors SP-3 was prepared in a reactor as described in Example 1. To this reactor were charged under a nitrogen blanket 3340 g of an ethylene oxide-tipped polyoxyalkylene hexa-ol having an OH-value of 28 mg KOH/g and a nominal molecular weight of 12,000 together with 40 g phthalic anhydride (=1.0 mole equivalent) and 60 g methyl isobutyl ketone. After one night stirring at 120° C. 37.4 g glycidyl methacrylate (=1.0 mole equivalent) and 0.34 g ethyl triphenyl phosphonium iodide in 10 ml dichloromethane were added and the mixture was stirred overnight.

The product obtained was a clear yellow liquid having a viscosity of 2300 mPa.s.

EXAMPLE 4

(Comparative)

Stabiliser precursor SP-4 was prepared as described in Example 3, except that in the first step 975 g of a polyoxyalkylene triol having an OH-value of 46 mg KOH/g and a nominal molecular weight of 3600 was used as the polyol.

The product obtained was a clear, light yellow liquid having a viscosity of 730 mPa.s.

EXAMPLE 5

Stabiliser precursor SP-5 was prepared as described in Example 4, except that prior to the first step, the polyol used in Example 4 was subjected to a coupling reaction with 0.50 mole equivalent 4,4'-MDI in the presence of a tin octoate catalyst. 961 g of the resulting OH-terminated prepolymer was subsequently charged into the reactor together with 11.3 g phthalic anhydride and 11.0 g glycidyl methacrylate.

The brownish product had a viscosity of 4990 mpa.s.

EXAMPLE 6

Stabiliser precursor SP-6 was prepared as described in Example 5, except that lower amounts of phthalic anhydride and glycidyl methacrylate were used, namely 7.2 g phthalic anhydride and 6.8 g glycidyl methacrylate.

The resulting clear, light yellow product had a viscosity of 6500 mpa.s.

EXAMPLE 7

The macromers SP-1 to SP-6 were used to prepare polymer polyols in the experiments designated as PP-1 to PP-8 as described herein after. The experiments PP-1 to PP-7 illustrate the present invention, while experiment PP-8 is included for comparative purposes. The polymer was polystyrene (S/AN ratio=100/0) or a styrene/acrylonitrile copolymer (S/AN ratio=60/40).

Into a one liter reactor fitted with a heater, a stirrer a thermocouple and inlet and outlet means and under a blanket of nitrogen the amounts of reactants as indicated in Table I were added. After heating the reactor contents (i.e. part of the base polyol, the macromer and isopropyl alcohol as chain transfer agent) to the reaction temperature, the feed charge was added over a period of 3 hours, except for PP-5, where the feed charge period was 2 hours. Upon completion of the addition, the reaction product was held at reaction temperature for 2 hours and was subsequently stripped of residual monomers for 5 hours at 120 under vacuum. The base polyol used was the polyol described in Example 4.

The abbreviations AMBN and AIBN as used in Table I stand for azobis(2-methylbutanenitrile) and azobis (isobutyronitrile), respectively.

The results are indicated in Table II.

From Table II it can be seen that the macromers according to the present invention (i.e. SP-1, SP-2, SP-3, SP-5 and SP-6) result in stable polymer polyols, which can be obtained at high conversions (relative to the amount of monomers charged) and which have low viscosities (i.e. <10,000 mpa.s) at high solids content (around 40% by weight based on the amount of monomers used). The mean particle size in all cases is less than 2 $\mu$m, which is an indication that the particles can remain in a stably dispersed condition.

The macromer which is not in accordance with the present invention because its molecular weight is too low (SP-4), does not result in a stable polymer polyol system (experiment PP-8) as during the polymerization reaction solidification of the system occurs.

TABLE I

Preparation of Polymer Polyols

| Polymer Polyol | PP-1 | PP-2 | PP-3 | PP-4 | PP-5 | PP-6 | PP-7 | PP-8 |
|---|---|---|---|---|---|---|---|---|
| S/AN | 100/0 | 100/0 | 100/0 | 60/40 | 60/40 | 100/0 | 100/0 | 100/0 |
| macromer | SP-1 | SP-2 | SP-3 | SP-3 | SP-1 | SP-5 | SP-6 | SP-4 |
| reaction temperature (° C.) | 90 | 90 | 90 | 100 | 100 | 90 | 90 | 90 |
| polymerization initiator | AMBN | AIBN | AIBN | AMBN | AMBN | AMBN | AMBN | AIBN |
| Reactor contents | | | | | | | | |
| base polyol (g) | 180 | 180 | 160 | 120 | 120 | 161 | 159 | 161 |
| macromer (g) | 20 | 20 | 40 | 26 | 26 | 23 | 20 | 20 |
| isopropyl alcohol (g) | 30 | 30 | 30 | 20 | 20 | 30 | 30 | 30 |
| Feed | | | | | | | | |
| Total monomer(s) (g) | 410 | 420 | 410 | 260 | 260 | 471 | 473 | 425 |
| initiator (g) | 4.7 | 4.1 | 4.0 | 3.5 | 3.5 | 5.4 | 5.4 | 4.2 |
| base polyol (g) | 390 | 380 | 390 | 240 | 240 | 476 | 476 | 431 |
| toluene (g) | — | — | — | 65 | 65 | — | — | — |
| macromer (g) | — | — | — | — | — | 9.5 | 10.2 | 11.7 |

TABLE II

Properties of Polymer Polyols

| Polymer Polyol | PP-1 | PP-2 | PP-3 | PP-4 | PP-5 | PP-6 | PP-7 | PP-8 |
|---|---|---|---|---|---|---|---|---|
| Conversion (%) | 98 | 96 | 97 | 99 | 99 | 98 | 99 | (*) |
| Solids content (% wt) | 41 | 41 | 40 | 40 | 39 | 40 | 40 | — |
| Viscosity (mPa·s) | 7000 | 5700 | 8100 | 4440 | 9150 | 4990 | 8200 | — |
| Mean particle size (μm) | 0.73 | 1.3 | 1.4 | 0.25 | 0.44 | 1.7 | 1.4 | — |

(*) Experiment has aborted due to solidification of the reaction mixture during the reaction.

What is claimed is:

1. A process for the preparation of a macromer having a nominal molecular weight of at least 4000 suitable as a stabiliser precursor in a polymer polyol, which process comprises reacting a polyether polyol having an average nominal functionality of at least 2.5 excluding polyether polyols containing two terminal hydroxyl groups in the molecule with a cyclic dicarboxylic acid anhydride not containing any polymerizable double bond, and subsequently reacting the adduct thus obtained with an epoxide compound containing polymerisable double bond, wherein the molar ratio of said anhydride and said polyol is from about 0.5:1 to about 2:1.

2. The process according to claim 1, wherein the polyol has a nominal molecular weight in the range of from about 5000 to About 14,000, and an average nominal functionality of from 2.5 to 6.0.

3. The process according to claim 1, wherein the cyclic dicarboxylic acid anhydride is phthalic anhydride.

4. The process according to claim 3, wherein the epoxide compound is glycidyl methacrylate or glycidyl acrylate.

5. The process according to claim 1, wherein the adduct is first partly reacted with a di- or higher functional epoxide compound before being reacted with the expoxide compound containing a polymerisable double bond.

6. The process according to claim 4, wherein the polyol is reacted with a di- or higher functional isocyanate compound preceding the reaction between the polyol and the cyclic dicarboxylic acid anhydride.

7. The process according to claim 4, wherein the adduct is first partly reacted with the epoxide compound containing a polymerisable double bond and the reaction product thus obtained is subsequently reacted with a di- or higher functional epoxide compound or a di- or higher functional isocyanate compound.

8. The macromer having a nominal molecular weight of at least 4000, obtained by the process according to 1.

9. A process for the preparation of a polymer polyol, which process comprises polymerizing in a base polyol at least one ethylenically unsaturated monomer in the presence of a polymerization initiator and a macromer having a nominal molecular weight of at least about 4,000 obtained by a process comprising the steps of reacting a polyether polyol having an average nominal functionality of at least 2.5 excluding polyether polyols containing two terminal hydroxyl groups in the molecule with a cyclic dicarboxylic acid anhydride not containing any polymerizable double bond, and subsequently reacting the adduct thus obtained with an epoxide compound containing polymerisable double bond, wherein the molar ratio of said anhydride and said polyol is from about 0.5:1 to about 2:1.

10. The process according to claim 9, wherein the ethylenically unsaturated monomer are styrene and acrylonitrile in a molar ratio of from 50:50 to 100:0.

11. The process according to claim 9, wherein the amount of ethylenically unsaturated monomer(s) is 20 to 55% by weight based on total weight of base polyol, monomer(s) and macromer.

12. A polymer polyol comprising 20–55% by weight, based on total weight of the polymer polyol, of a polymer derived from at least on ethylenically unsaturated compound, which polymer is dispersed in a base polyol and stabilized with a macromer having a nominal molecular weight of from about 5000 to about 50,000 obtained by a process comprising the steps of reacting a polyether polyol having an average nominal functionality of at least 2.5 excluding polyether polyols containing two terminal hydroxyl groups in the molecule with a cyclic dicarboxylic acid anhydride not containing any polymerizable double bond, and subsequently reacting the adduct thus obtained with an epoxide compound containing polymerisable double bond, wherein the molar ratio of said anhydride and said polyol is from about 0.5:1 to about 2:1.

13. The flexible polyurethane foam obtained by foaming a composition comprising a polymer polyol according to claim 12 and a polyisocyanate component.

14. The shaped article comprising the flexible polyurethane foam according to claim 13.

15. A process for the preparation of a macromer having a nominal molecular weight of at least 4000 suitable as a stabiliser precursor in a polymer polyol, which process comprises reacting a polyoxyalkylene hexa-ol, made from a hexa-ol and alkylene oxide comprising propylene oxide, having an average nominal functionality of 6.0 with a cyclic dicarboxylic acid anhydride not containing any polymerizable double bond, and subsequently reacting the adduct thus obtained with an epoxide compound containing polymerisable double bond, wherein the molar ratio of said anhydride and said polyol is from about 0.5:1 to about 2:1.

16. A process for the preparation of a polymer polyol, which process comprises polymerizing in a base polyol at least one ethylenically unsaturated monomer in the presence of a polymerization initiator and a macromer having a nominal molecular weight of from about 5,000 to about 50,000 obtained by a process comprising the steps of reacting a polyoxyalkylene hexa-ol, made from a hexa-ol and alkylene oxides comprising propylene oxide, having an average nominal functionality of 6.0 with a cyclic dicarboxylic acid anhydride not containing any polymerizable double bond, and subsequently reacting the adduct thus obtained with an epoxide compound containing polymerisable double bond, wherein the molar ratio of said anhydride and said polyol is from about 0.5:1 to about 2:1.

\* \* \* \* \*